United States Patent
Achinger et al.

(10) Patent No.: US 12,355,333 B2
(45) Date of Patent: Jul. 8, 2025

(54) ACTUATOR AND METHOD FOR CONTROLLING THE BRAKE OF AN ACTUATOR

(71) Applicant: AUMA RIESTER GMBH & CO. KG, Müllheim (DE)

(72) Inventors: Robert Achinger, Nuremberg (DE); Rudolf Morlang, Villingen-Schwenningen (DE); Vladimir Fichte, Nuremberg (DE)

(73) Assignee: AUMA RIESTER GMBH & CO. KG, Mullheim (DE)

( * ) Notice: Subject to any disclaimer, the term of this patent is extended or adjusted under 35 U.S.C. 154(b) by 1300 days.

(21) Appl. No.: 17/009,981

(22) Filed: Sep. 2, 2020

(65) Prior Publication Data

US 2021/0071739 A1    Mar. 11, 2021

(30) Foreign Application Priority Data

Sep. 9, 2019   (DE) .......................... 102019124149.9

(51) Int. Cl.
*H02K 7/10*    (2006.01)
*F16H 1/06*    (2006.01)
(Continued)

(52) U.S. Cl.
CPC .............. *H02K 7/116* (2013.01); *F16H 1/06* (2013.01); *F16H 1/20* (2013.01); *F16H 2057/02034* (2013.01); *H02K 7/102* (2013.01); *H02K 7/14* (2013.01); *H02K 11/21* (2016.01); *H02K 19/02* (2013.01); *H02K 2213/06* (2013.01); *H02K 2213/12* (2013.01)

(58) Field of Classification Search
CPC ..... F16H 1/06; F16H 1/20; F16H 1/26; F16H 57/02; F16H 2057/02034; H02K 7/102; H02K 7/1023; H02K 7/1025; H02K 7/116; H02K 7/14; H02K 11/21; H02K 19/02; H02K 2213/06; H02K 2213/12
See application file for complete search history.

(56) References Cited

U.S. PATENT DOCUMENTS 1,728,279 A  *  9/1929  Ramsey ................ F16H 57/033
                                                      470/96
2,782,827 A     2/1957  Rosan
(Continued)

FOREIGN PATENT DOCUMENTS

DE         1042311        10/1958
DE         3911592 A1  *  10/1990
(Continued)

OTHER PUBLICATIONS

Machine translation of DE 19909227 A1 obtained on Jan. 11, 2024.*

(Continued)

*Primary Examiner* — Adam D Rogers
(74) *Attorney, Agent, or Firm* — Grogan, Tuccillo & Vanderleeden LLP

(57) ABSTRACT

The invention relates to an actuator with a modular system for creating a plug-in gearbox, wherein the modular system comprises at least one output gear wheel and at least one plug-in element, and wherein a plug-in gearbox with one to five stages can be created by the modular system.

16 Claims, 6 Drawing Sheets

(51) Int. Cl.
  *F16H 1/20* (2006.01)
  *H02K 7/116* (2006.01)
  *F16H 57/02* (2012.01)
  *H02K 7/102* (2006.01)
  *H02K 7/14* (2006.01)
  *H02K 11/21* (2016.01)
  *H02K 19/02* (2006.01)

(56) References Cited

U.S. PATENT DOCUMENTS

| | | | | |
|---|---|---|---|---|
| 3,009,366 | A * | 11/1961 | Thorpe | F16H 1/20 74/606 R |
| 3,410,148 | A * | 11/1968 | Clarke | F16H 3/02 74/331 |
| 5,680,793 | A * | 10/1997 | Flamang | F16H 57/033 74/325 |
| 6,003,837 | A | 12/1999 | Raymond, Jr. et al. | |
| 7,291,951 | B2 * | 11/2007 | Takiguchi | B60Q 1/076 310/67 R |
| 8,342,478 | B1 | 1/2013 | Cordray et al. | |
| 8,957,559 | B2 * | 2/2015 | Schneider | H02K 7/116 310/43 |
| 9,163,700 | B2 * | 10/2015 | Schneider | H02K 1/278 |
| 9,638,311 | B2 * | 5/2017 | Fukuda | G01P 1/04 |
| 10,306,792 | B2 | 5/2019 | Sturm et al. | |
| 10,405,609 | B2 * | 9/2019 | Orand | F16H 1/20 |
| 10,644,546 | B2 * | 5/2020 | Billet | H02K 1/18 |
| 10,663,034 | B2 * | 5/2020 | Xiong | F16H 1/06 |
| 10,702,932 | B2 * | 7/2020 | Kumakura | B23D 45/16 |
| 10,816,079 | B2 * | 10/2020 | Kannan | F16K 5/08 |
| 10,890,242 | B2 * | 1/2021 | Masuzawa | F16H 57/021 |
| 10,935,107 | B2 * | 3/2021 | Chen | H02K 7/108 |
| 11,031,842 | B2 * | 6/2021 | Watrin | F16H 57/02 |
| 11,371,583 | B2 * | 6/2022 | Yoshigasaki | F16H 1/06 |
| 11,767,900 | B2 * | 9/2023 | Chen | F16H 57/031 74/413 |
| 11,940,046 | B2 * | 3/2024 | Gautier | F16H 63/304 |
| 2015/0252874 | A1 * | 9/2015 | Lemercier | H02K 7/116 74/413 |
| 2017/0023103 | A1 * | 1/2017 | Liu | F16H 1/20 |
| 2018/0180172 | A1 | 6/2018 | Handle et al. | |
| 2018/0347682 | A1 * | 12/2018 | Masuzawa | F16H 1/06 |
| 2021/0013780 | A1 * | 1/2021 | Yuan | H02K 11/215 |
| 2024/0110613 | A1 * | 4/2024 | Wijntjes | B62D 35/00 |

FOREIGN PATENT DOCUMENTS

| | | | |
|---|---|---|---|
| DE | 19909227 A1 | 10/1999 | |
| DE | 19935196 | 12/2000 | |
| DE | 19931818 | 1/2001 | |
| DE | 102010043179 A1 | 5/2012 | |
| DE | 102011054956 | 5/2013 | |
| DE | 102012007583 A1 * | 10/2013 | F16H 57/029 |
| DE | 102014107900 A1 * | 12/2014 | F16H 57/021 |
| DE | 112014006373 | 11/2016 | |
| DE | 102015215732 | 2/2017 | |
| EP | 0111350 A1 | 6/1984 | |
| EP | 1 052 159 | 3/2000 | |
| EP | 2290261 | 3/2011 | |
| EP | 3073163 | 6/2015 | |
| EP | 3278932 A1 | 2/2018 | |
| WO | WO-2024100366 A1 * | 5/2024 | F16H 57/021 |

OTHER PUBLICATIONS

DE Office Action dated Aug. 21, 2020 issued in corresponding application DE 10 2019 124 149.9.
United States Office Action for corresponding U.S. Appl. No. 17/009,461 dated Apr. 18, 2023.
German Office Action dated Apr. 11, 2023 from corresponding German Application No. 10 2019 124 150.2.
Corresponding European Application Search Report.
1 United States Office Action in connection with U.S. Appl. No. 17/009,461 dated Apr. 29, 2022.
Examination Report, dated Mar. 26, 2024, from corresponding parallel European application EP 20 195 349-4.

* cited by examiner

ID BRAKE OF AN
ACTUATOR AND METHOD FOR
CONTROLLING THE BRAKE OF AN
ACTUATOR

CROSS-REFERENCE TO RELATED
APPLICATIONS

This application claims priority to German Patent Application Serial No. 10 2019 124 149.9, filed on Sep. 9, 2019, which is hereby incorporated by reference herein in its entirety.

FIELD OF THE INVENTION

The invention relates to an actuator with a motor, e.g., for controlling a valve position. The motor may preferably be a synchronous motor, e.g., a servomotor.

BACKGROUND OF THE INVENTION

Actuators of the above-mentioned type are known in the art. Although the rotational speeds of motors, such as, e.g., synchronous motors, in such actuators often can be controlled, it was found that the motors often do not operate within their optimum range. Motors of the above-mentioned actuators may therefore often have poor efficiency, when varying rotational speeds are to be set.

Thus, the problem involves improving the performance characteristics of these actuators.

This problem is solved according to the invention by an actuator with the features described herein.

SUMMARY OF THE INVENTION

In particular, an actuator with a motor, in particular a synchronous motor, and a plug-in gearbox is proposed in order to solve this problem. It is thus possible to use the plug-in gearbox to create such gear ratios in order to set up a desired rotational speed at an output gear wheel and/or at an output shaft, preferably at constant motor-shaft speeds and/or at motor-shaft speeds within an optimum operating range for the motor. This makes it possible to improve the efficiency of the motor.

The plug-in gearbox can thus be set up to provide different gear ratios through a modular system having at least several (multi-stage) plug-in elements, and/or provide direct output-wheel drive via the (single-stage) motor shaft. Thus, the invention also relates to a modular system for producing a plug-in gearbox for an actuator. The plug-in gearbox may preferably be designed as a gear wheel transmission.

Below follows a description of advantageous embodiments of the invention, which, alone or in combination with the features of other embodiments, can optionally be combined with the features according to a preferred embodiment described herein.

According to an embodiment of the invention, a motor shaft and an output gear wheel of the plug-in gearbox gear may be axially adjustable relative from one another. In particular, the axial adjustment may allow for setting up at least two different positions. This provides a solution, which allows for configuring a preferred gear ratio via the plug-in gearbox in a highly flexible and as-needed manner involving little effort in order to adjust a required output torque on an output gear wheel.

According to a preferred embodiment of the invention, a space may be provided between the motor shaft and the output gear wheel for at least one plug-in element in at least one position. In particular, this position can be obtained by the aforementioned axial relative adjustment between the motor shaft and the output gear wheel. Moreover, this makes it possible to achieve a particularly space-saving arrangement of the gear parts, whereby the overall installation space for the plug-in gearbox can be kept at a minimum. Furthermore, the required number of parts can be reduced to a minimum. On a general note, due to the adjustable space between the motor shaft and the output gear wheel, multi-stage plug-in gearboxes can be produced in a particularly simple manner without having to make structural changes to the basic actuator. Instead, the performance characteristics of the plug-in gearbox may be adapted to the required conditions simply by using additional components, in particular at least one additional plug-in element. In particular, differently sized plug-in elements (especially in terms of diameter) can be installed to create different gear ratios.

According to a further advantageous embodiment, the at least one plug-in element may be fastened on at least one pin, preferably at least one permanently pre-assembled pin, or it may be fastened in the operating position. The plug-in element may have at least one gear wheel to enable power and torque transmission to a successive plug-in element and/or the output gear wheel. The pins can provide the user with a certain structural design of a plug-in gearbox, which can be produced by the user, provided they are permanently pre-assembled. However, it is also conceivable that the user will be able to freely choose the placement of the pins and/or remove the pre-assembled pins. This allows a particularly high degree of flexibility, when configuring different gear ratios in order to adjust the required output torque at the output gear wheel.

In order to achieve the simplest possible and appropriate placement of the components of the plug-in gearbox, the at least one plug-in element can be or is fastened by at least one spacer sleeve in an axial position along the pin. This allows the user to quickly and easily align individual plug-in elements properly relative from one another, and/or relative to the motor shaft and/or the output gear wheel.

A particularly preferred embodiment can provide that at least two plug-in elements are arranged axially offset from one another. In particular, the two plug-in elements may have a common pin and/or a common center of rotation, or may be arranged laterally offset from one another. This means that the radial installation space of the plug-in gearbox preferably remains unchanged, possibly needing more installation space only in the axial direction. In principle, however, the described solution makes possible a particularly space-saving arrangement of the gear parts.

According to an advantageous development of the invention, two plug-in elements, in particular at least three plug-in elements, in particular at least four plug-in elements, in particular at least five plug-in elements, may be arranged between the motor shaft and the output gear wheel. This allows for setting up two-stage, as well as three- and multi-stage plug-in gearboxes.

A further advantageous development of the invention can provide that at least one plug-in element has two gear wheels with different diameters. A particular advantage here is the option of fastening the at least one plug-in element in two different orientations. Thus, several gear ratios can be created with only one plug-in element. Thus, when setting up the plug-in gearbox, the plug-in element comprising the two gear wheels may simply be turned around, which will allow for two possible orientations. It may be particularly preferred if a large part or all plug-in elements have two gear wheels with different diameters.

To create a simplified axial relative adjustment between the motor shaft and the output gear wheel, a further development of the invention can provide that a mesh area of the motor shaft rotating in the circumferential direction and/or having teeth is made longer in the axial direction than a mesh area of a gear wheel of the at least one plug-in element. In particular, the mesh area of the motor shaft can be made longer in the axial direction than the mesh areas of the gears of all the plug-in elements. In this embodiment, the installation space required for the gear parts can therefore be kept as small as possible, since only the motor shaft requires more space in the axial direction. Axial relative adjustment between the motor shaft and the output gear wheel is thus still possible. In addition, this allows for meshing gears of the plug-in elements to engage with the motor shaft at two different locations axially offset from one another, thus enabling different power flows for additional plug-in elements.

According to another advantageous embodiment, a pin insertion area may have at least two pin insertion points, whereby the distance between the pin insertion points is less than the diameter of a smallest gearwheel, in particular less than the radius of a smallest gearwheel. This allows the plug elements on the pins to be variably offset, and also allows the user to select a pin position predefined by one of the pin-insertion points. Accordingly, it possible to reduce to a minimum the installation space required for the configuration of the plug-in gearbox, while still providing a particularly flexible solution for creating different gear ratios in a simple and less error-prone manner.

An advantageous development of the invention can provide for the arrangement of at least two plug-in elements on at least one pin. Thus, the plug-in elements can be mounted axially offset directly in succession or spaced apart on a pin. This allows for creating additional stages of the plug-in gearbox in a simple and space-saving manner.

According to a further advantageous embodiment, the plug-in gearbox may be one that can be assembled particularly by a user, whereby the user can make use of a modular system consisting of different gear parts. The modular system may have at least one output gear wheel and at least one plug-in element. Preferably, the modular system may have several plug-in elements with identical or different design. By using the same plug-in elements, which preferably can be used in different orientations, a particularly cost-effective production of a modular system and/or a plug-in gearbox and/or an actuator is achievable. The individual plug-in gearbox unit components can be produced, e.g., by injection molding, and/or sintering, and/or stamping processes. Thus, the invention also relates to the use of the previously described modular system for producing an actuator and/or implementing a process for producing an actuator.

The invention further relates to an actuator with a motor and a holding brake, characterized in that the holding brake is arranged on an A-bearing side of the motor. A holding brake in the sense of the invention can be understood as a safety brake for the purpose of braking the motion of masses and/or holding them at a safe standstill.

The holding brake may be, e.g., a spring-pressure brake.

Holding brakes are already known, whereby these are arranged on the so-called B-bearing side of a motor, in particular an electric motor. The braking effect on a mass to be braked, in particular a shaft (output shaft), using such holding brakes is therefore indirect, in that the braking effect acts directly on only one motor shaft. In the previously known solutions, a mass connected to the motor shaft or a shaft to be braked (output shaft) will therefore not be braked directly by the holding brake.

The solution described above provides a different approach. The actuator holding brake is arranged on the A-bearing side of the motor. The A-bearing side is the motor output side, upon which the motor shaft is supported in particular by a fixed bearing, and/or which protrudes from the motor housing. In other words, the A-bearing side represents the side on which a shaft to be braked (output shaft) is arranged. The holding brake may therefore have a direct effective connection to the shaft to be braked. If, for example, a rupture or other unintentional disconnection of a coupling between the motor shaft and the output shaft occurs due to material fatigue of a connection between the motor shaft and the output shaft, it is still possible to decelerate the output shaft using the solution according to the invention. This is impossible with holding brakes on the B-bearing side.

An advantageous development of the invention can provide that the output shaft may be placed in operative connection with a functional unit, in particular a valve, or is in operative connection in the operating position, thereby allowing for power transmission and/or torque transmission from the output shaft to the functional unit.

In order to set up a safety effect for the holding brake, the holding brake can be activated in the de-energized state and released in the energized state. A braking torque can be generated via preloaded springs. The holding brake can be released, e.g., electromagnetically, hydraulically, and/or pneumatically. If a preferred embodiment, the ventilation is electromagnetic. In the de-energized, i.e., unpowered state, the holding brake is locked in order to ensure that in case of damage to the holding brake, e.g., at the power supply, in the event of a fault or power failure, the braking torque is maintained and/or kicks off immediately.

In a further solution, independent of or supplementing the solution described above, the actuator can be provided with a detection device for determining the rotational speed of an output shaft, e.g., the aforementioned output shaft, whereby the actuator holding brake may be activated by a brake control or is activated, when the detection device signals that a rotational speed reached or fell short of reaching its target.

The invention further relates to a method for controlling a brake of an actuator, in particular an actuator according to one of the above claims, wherein an output shaft, which is detectable by the brake, is detected only after regenerative braking of the output shaft, until reaching or falling short of the target rotational speed of the output shaft. Thus, the heat generated at the brake by frictional contact can be reduced. In this way, the braking force of the motor can be used before the brake generates a braking effect. This reduces wear and tear, and thus allows for designing a particularly durable and low-maintenance actuator. In addition, the rotation of a mass to be braked can be used for energy recovery via the motor. A further advantage is that the brake can be dimensioned substantially smaller than is the case with previously known actuators, in that the brake is designed to generate lower braking torques. Hence, a more compact design of the whole actuator can generally be achieved.

The invention will now be described in more detail based on several exemplary embodiments; however, it is not limited to these exemplary embodiments. Further exemplary embodiments result from the combination of the features of individual or several claims with each other and/or with individual or multiple features of the exemplary embodiments.

DETAILED DESCRIPTION OF THE DRAWINGS

Figure 1:
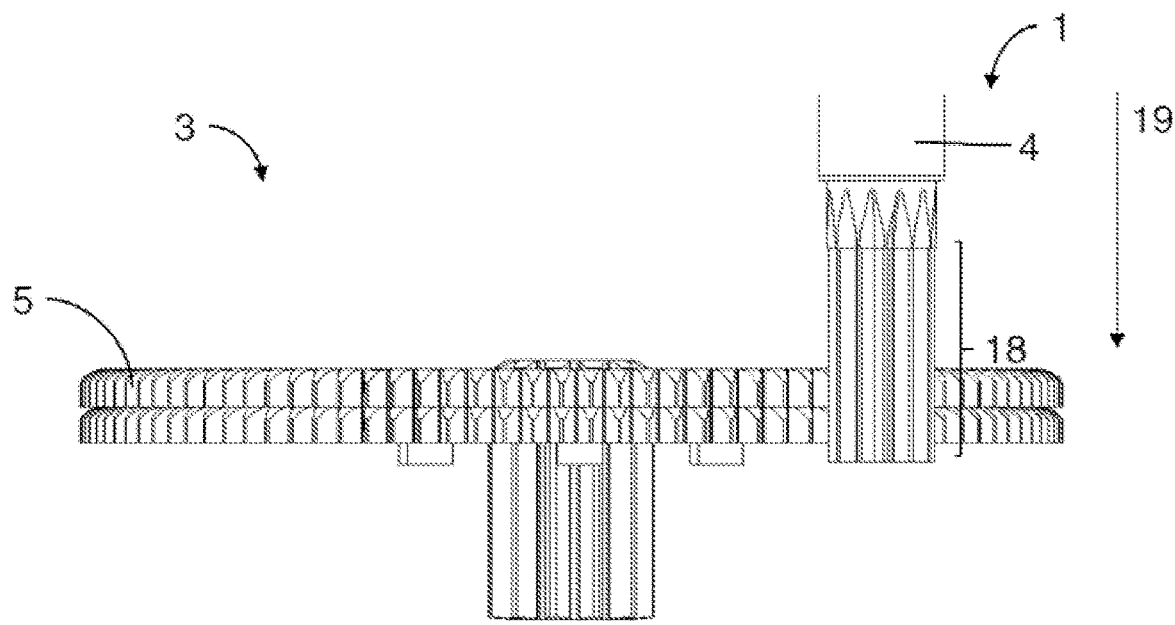
FIG. 1 represents a first embodiment of an actuator according to the invention depicting substantially the plug-in gearbox, which is designed with a single stage in the embodiment shown.
Figure 2:
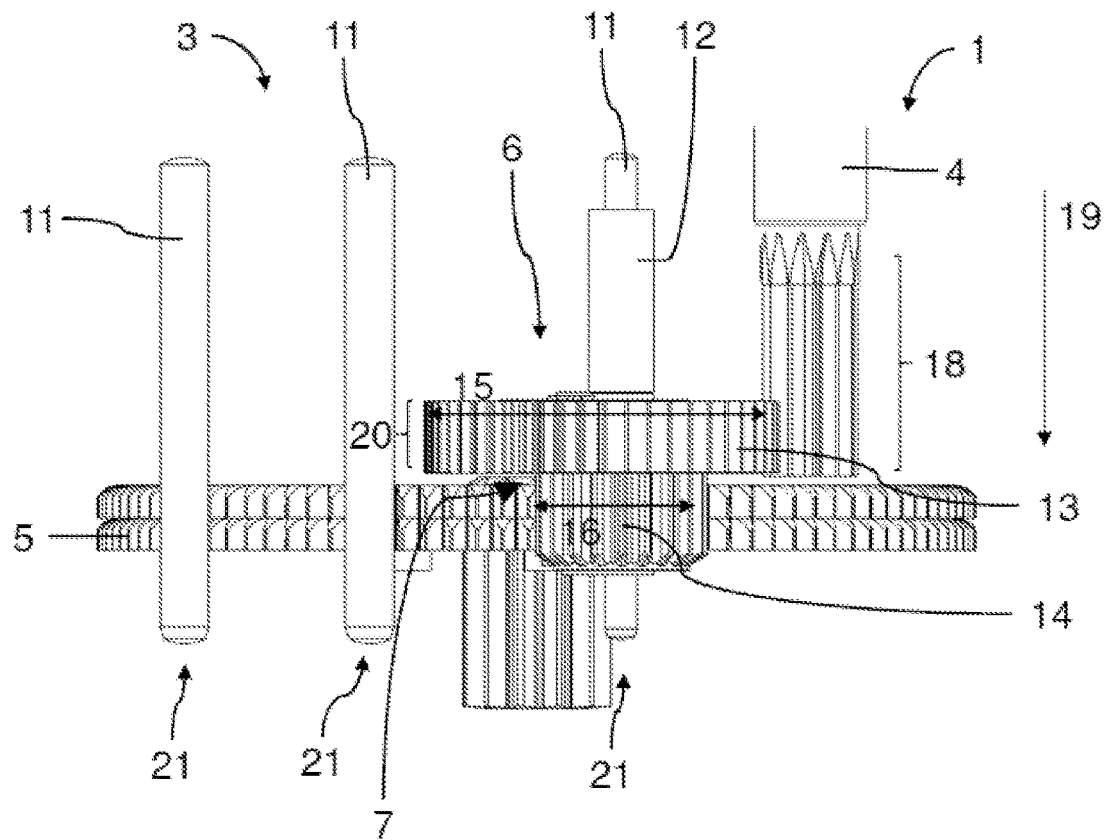
FIG. 2 represents a second embodiment of an actuator according to the invention depicting substantially the plug-in gearbox, which is designed with two stages in the embodiment shown.
Figure 3:
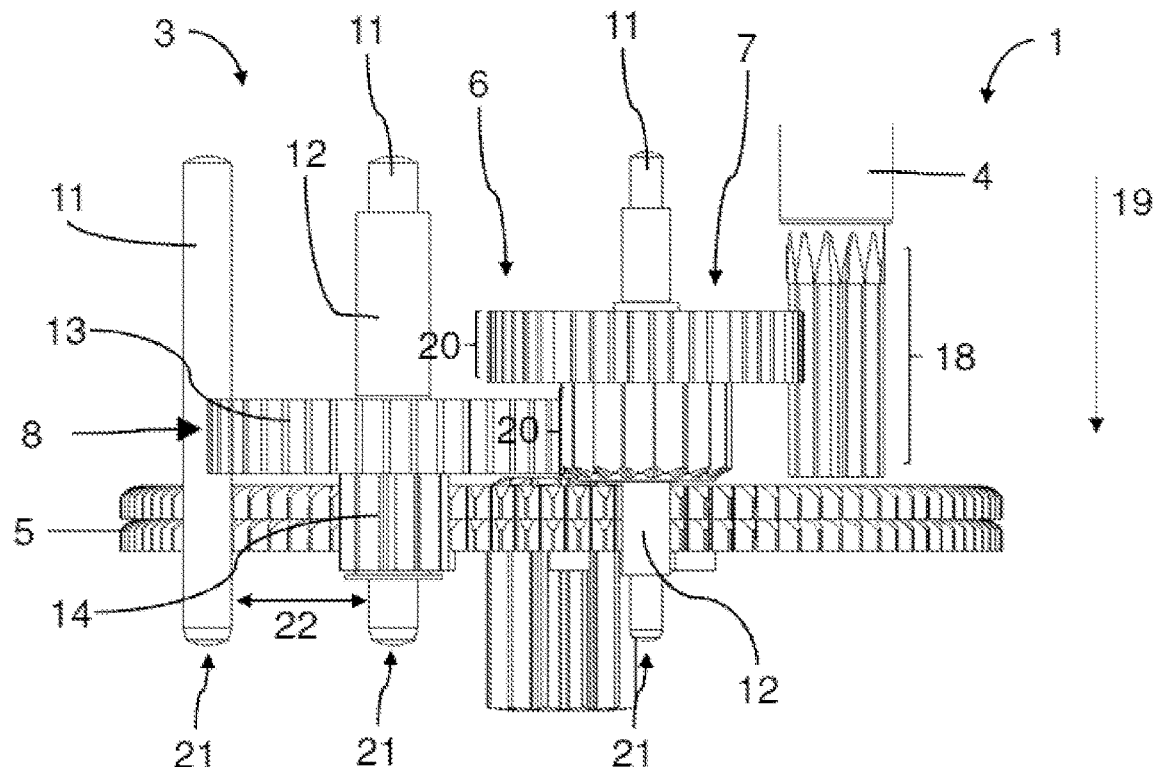
FIG. 3 represents a third embodiment of an actuator according to the invention depicting substantially the plug-in gearbox, which is designed with three stages in the embodiment shown.

Below follows a description of several embodiments of an actuator according to the invention, which is designated as 1 throughout.

Actuator 1 may be placed in an operative connection with a functional unit, especially a valve, or it may be placed in an operative connection in the operating position.

Actuator 1 has a motor 2 (electric motor), which may be a synchronous or asynchronous motor.

In the embodiments of FIGS. 1 to 8, the main focus is on a plug-in gearbox 3, which is described in detail below.

In order to produce an appropriate plug-in gearbox 3, according to the invention, a user has available a modular system with several gear parts, with which a plug-in gear adapted to the respective application may be produced quickly and easily. The invention therefore also relates to an application for producing a modular system, as described and claimed herein. The modular system will likewise be discussed in more detail below.

Motor 2 of actuator 1 has a motor shaft 4, via which a torque generated by motor 2 can be transmitted to a functional unit and/or an output shaft 33, which is or may be connected to motor shaft 4. Due to the active connection described above, power transmission and/or torque transmission from the output shaft 33 to the functional unit then becomes possible.

Motor 2 has an A-bearing side 24, and a B-bearing side. A-bearing side 24 is generally defined as an output side of motor 2, at which the motor shaft 4 is led out of the motor housing and/or on which a functional unit and/or output shaft 33 is connected. The B-bearing side is thus defined as the side of the motor housing facing away from the A-bearing side. Normally the B-bearing side is designed as the fan side.

The plug-in gearbox 3 of the actuator has at least one output gear wheel 5, which is directly or indirectly connected to the motor shaft 4, i.e., it can be driven directly or indirectly by the motor shaft 4, in particular by intermediate plug-in elements 7, 8, 9, 10.

The motor shaft 4 and the output gear wheel 5 can be adjusted relative from one another in the axial direction 19 (in particular in relation to a rotational axis of motor shaft 4 and/or output gear wheel 5. Here, the adjustment can be made by changing the position of the motor shaft 4 and/or the output gear wheel 5. Output gear wheel 5 can also be designed as an output shaft 33 or coupled with an output shaft 33.

With the axial relative adjustment described above, (installation) space 6 can be created between the motor shaft 4 and the output gear wheel 5, in which space, at least one plug-in element 7, 8, 9, 10 can be arranged or is arranged in the operating position. This means that a multi-stage plug-in gearbox 3 can be or is created with at least one plug-in element 7, 8, 9, 10. The axial relative adjustment can be performed just enough for sufficient space 6 to be created in order to arrange the number of plug-in elements 7, 8, 9, 10 in the required alignment/orientation, depending on the application, as required for setting up a desired output torque at output gear wheel 5. This allows for a particularly high degree of variability, when setting a preferred output torque, as this setting is not or not necessarily done via the motor speed, but rather via the selected gear ratios of plug-in gearbox 3. Such flexibly adjustable actuators 1 and/or systems for forming a plug-in gearbox 3 for actuators 1 are not yet available. It is likewise possible to keep the required space to a minimum, whereby particularly compact actuators 1 can be provided.

Due to the large number of different gear ratios that can be created by the plug-in gearbox 3, it is possible to set the motor speed to almost constant and/or at an optimum operating range, which provides optimum efficiency of motor 2. This allows for reducing the heat development.

As shown in FIG. 1, plug-in gearbox 3 can only be of a single-stage design, whereby when operating actuator 1, output gear wheel 5 is directly driven by motor shaft 4, in particular directly meshed.

FIGS. 2-5 depict multi-stage versions of the plug-in gearbox 3. Here, the number of stages is determined by the number of plug-in elements 7, 8, 9, 10 connected between the motor shaft 4 and the output gear wheel 5.

Each plug-in element 7, 8, 9, 10 has at least one gearwheel 13, 14. However, it may also be provided that individual or all plug-in elements 7, 8, 9, 10 have several gear wheels 13, 14 each for transmitting a torque to other gear wheels and/or output gear wheel 5. These plug-in elements 7, 8, 9, 10 may be or are arranged in two different orientations.

The plug-in elements 7, 8, 9, 10 can or are mounted on pin 11, especially plugged in, as shown in FIGS. 1-6. Axial fixation can be achieved, e.g., by positive and/or frictional locking and/or by a spacer sleeve 12, also mounted on the same pin 11. The length of the spacer sleeve 12 can thus define the axial position of a plug-in element 7, 8, 9, 10 along pin 11.

Actuator 1 may have several pins 11, with one or more plug-in elements 7, 8, 9, 10 arranged and/or fastened thereon. The pins 11 may be permanently pre-assembled, e.g., on an assembly unit including an insertion area. However, an embodiment, in which the user freely can select the pin insertion points 21 for the individual pins 11, is also possible.

As shown in FIGS. 3-6, the plug-in gearbox 3 may have several plug-in elements 7, 8, 9, 10 offset from one another in the axial direction 19 and/or arranged at the same height. The plug-in elements 7, 8, 9, 10 can be arranged laterally offset from one another. Alternatively or in addition, at least two plug-in elements 7, 8, 9, 10 can be arranged axially offset on a pin 11, such that their axes of rotation are identical.

The embodiments shown in FIGS. 1 to 8 each have plug-in elements 7, 8, 9, 10 with two gear wheels 13, 14. Here, the two gear wheels 13, 14 of a plug-in element 7, 8, 9, 10 have different diameters. The advantage is that such plug-in elements 7, 8, 9, 10 can be used in two different orientations to create different ratios. Furthermore, this embodiment has the advantage of not needing several different gear parts in order to create different gear ratios. This translates into a reduction of the production costs.

Figure 4:
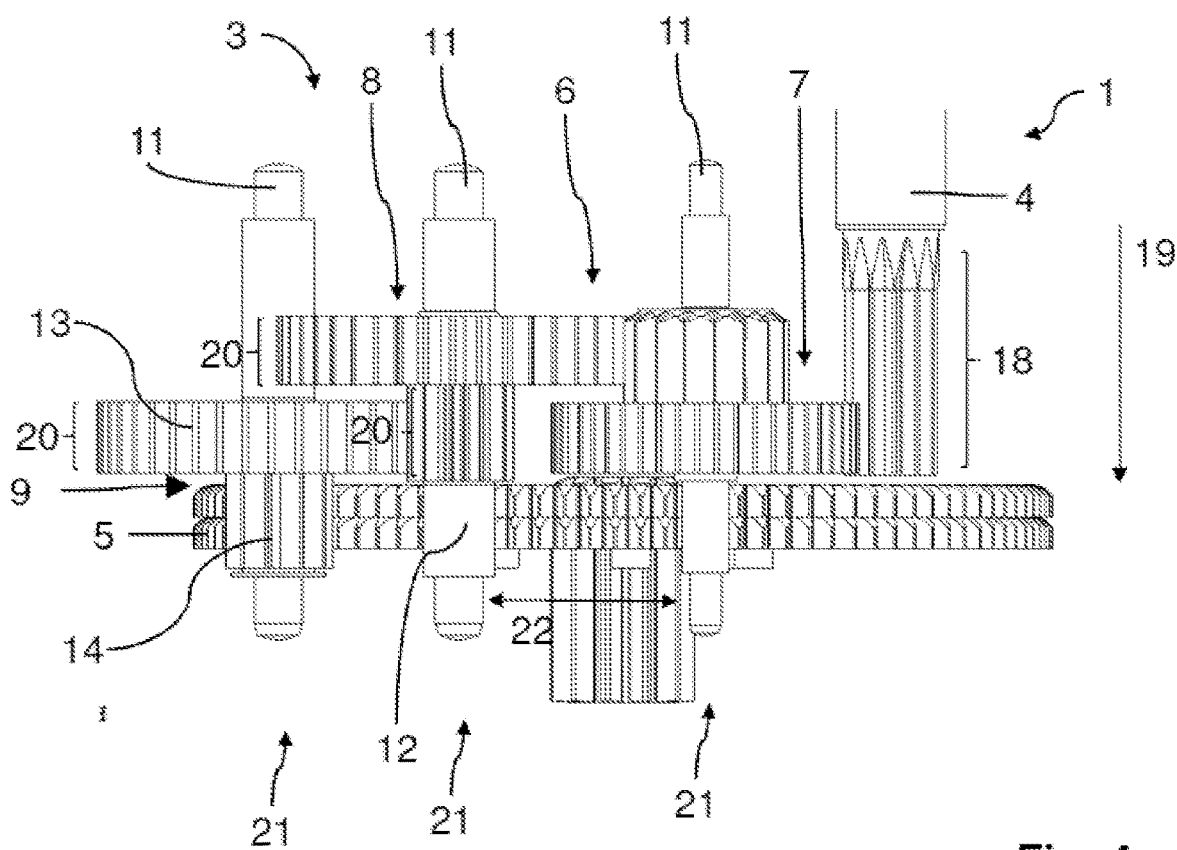
FIG. 4 represents s a fourth embodiment of an actuator according to the invention depicting substantially the plug-in gearbox, which is designed with four stages in the embodiment shown.
Figure 5:
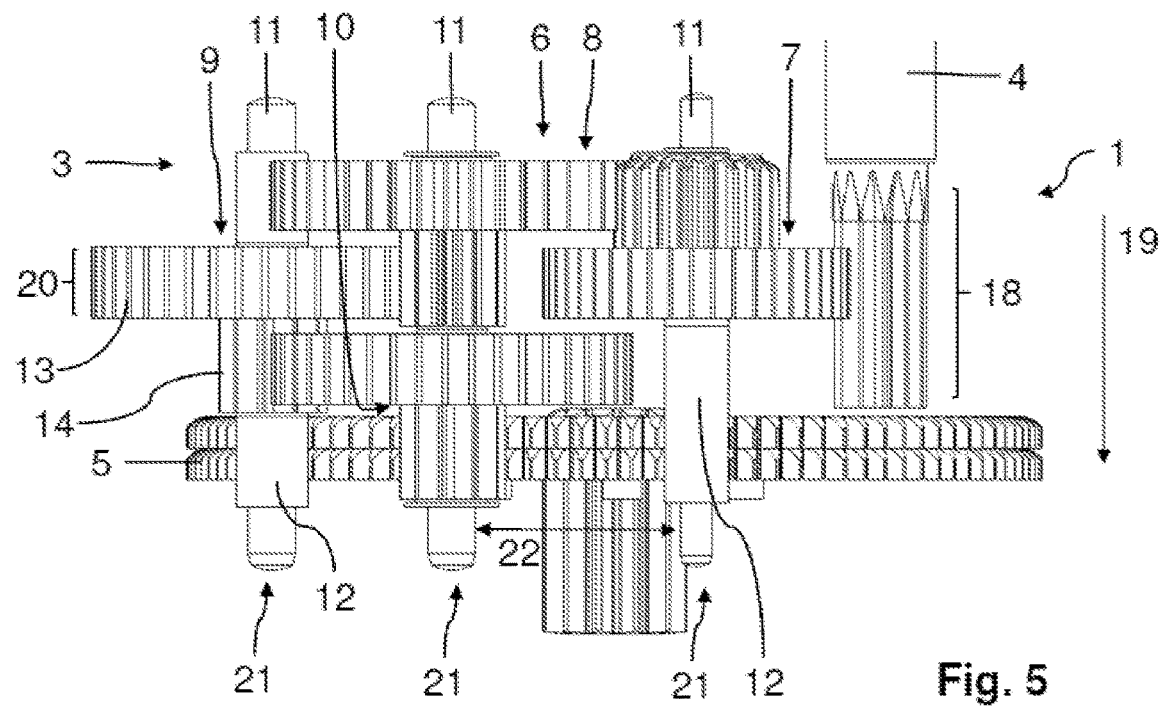
FIG. 5 represents a fifth embodiment of an actuator according to the invention depicting substantially the plug-in gearbox, which is designed with five stages in the embodiment shown.
Figure 6:
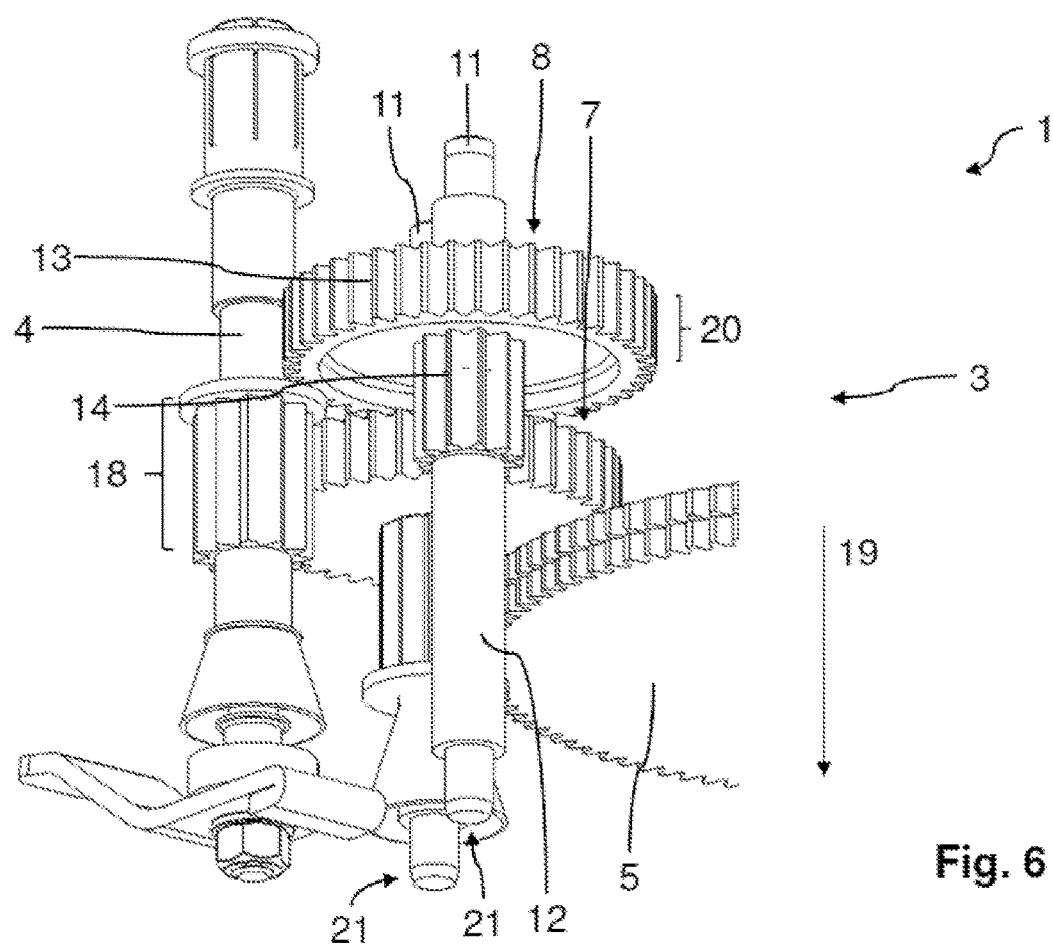
FIG. 6 represents a perspective view of a detailed view of an actuator with a three-stage transmission.
Figure 7:
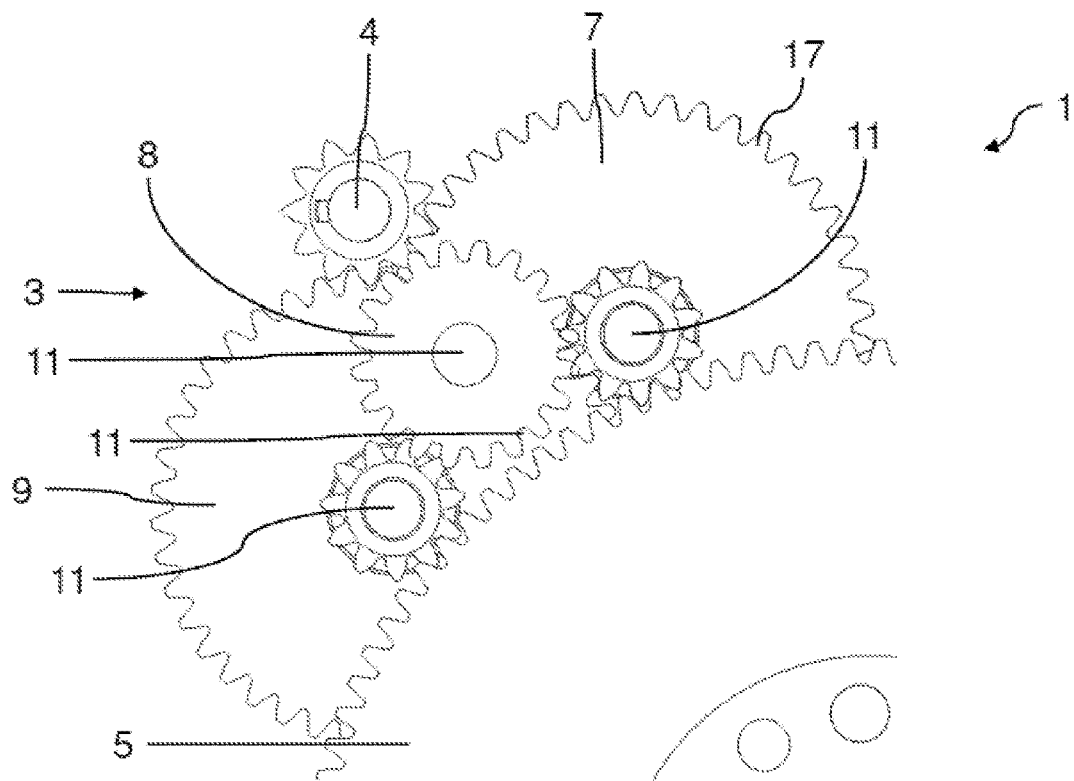
FIG. 7 represents a top view of a plug-in gear of an embodiment of an actuator here depicting at least a four-stage gear ratio.
Figure 8:
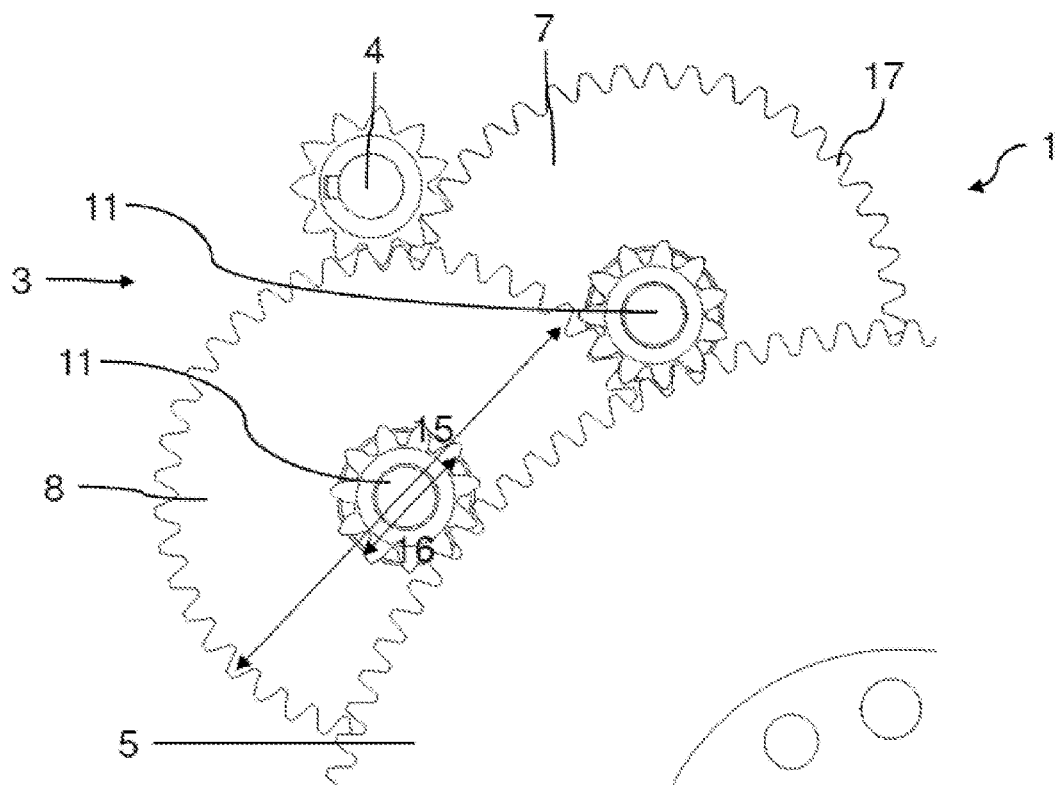
FIG. 8 represents a top view of a plug-in gear of an embodiment of an actuator here depicting at least a three-stage gear ratio.

The plug-in gearbox 3 may have identically designed plug-in elements 7, 8, 9, 10, as shown in FIGS. 4 and 5. For example, the orientation and/or axial position of the plug-in elements 7, 8, 9, 10, which in particular are structurally identical, can vary.

The motor shaft 4 has a mesh area 18, which in the operating position is either directly engaged with the output gear wheel or the intermediate gears of plug-in elements 7, 8, 9, 10. This allows for torque transmission from the motor shaft 4 to the output gear wheel 5, and/or the gear wheels 13, 14 of the plug-in elements 7, 8, 9, 10.

In particular, the mesh area of the motor shaft in the axial direction is made longer than the mesh areas of the gear wheels 13, 14 of the plug-in elements 7, 8, 9, 10. This makes it possible to make motor shaft 4 always engage a gearwheel 13, 14 and/or the output gear wheel 5, despite axial adjustment of the plug-in gearbox 3 and/or the motor shaft 4.

A distance 22 between the pin insertion points 21 is always smaller than a diameter, in particular a radius, of the smallest gear 13, 14 of a plug-in element 7, 8, 9, 10. This allows for a particularly space-saving arrangement of the gear parts.

Figure 9:
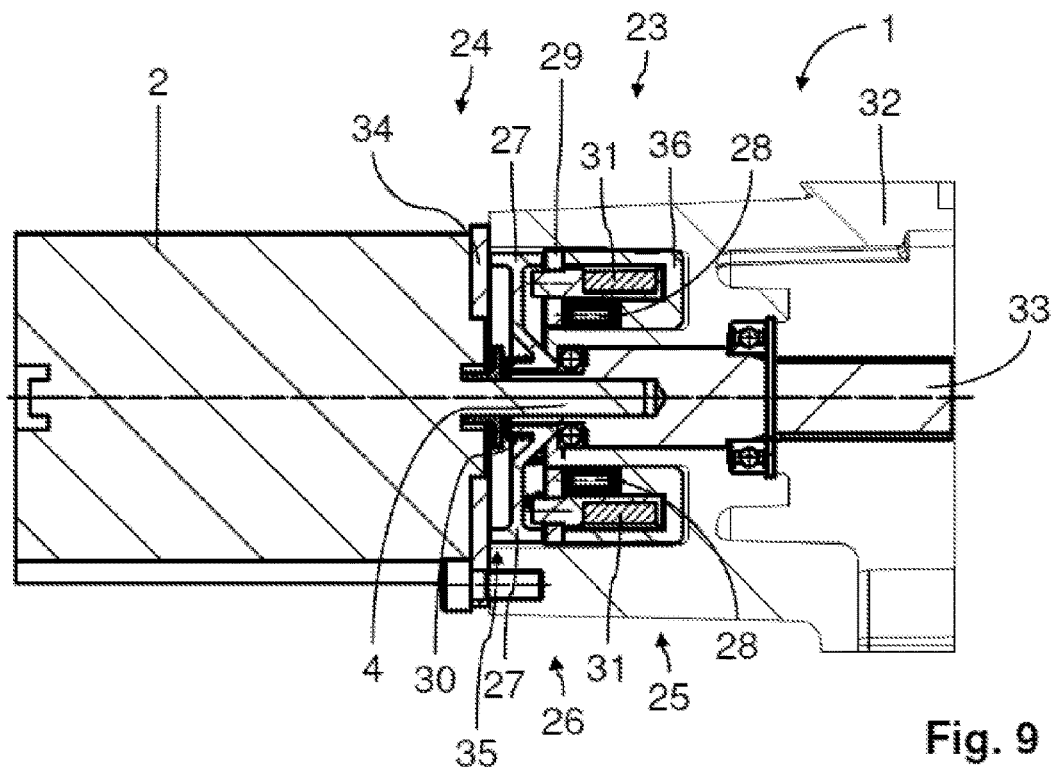
FIG. 9 represents an embodiment of an actuator according to the invention comprising a motor and a holding brake in a longitudinal sectional view.
Figure 10:
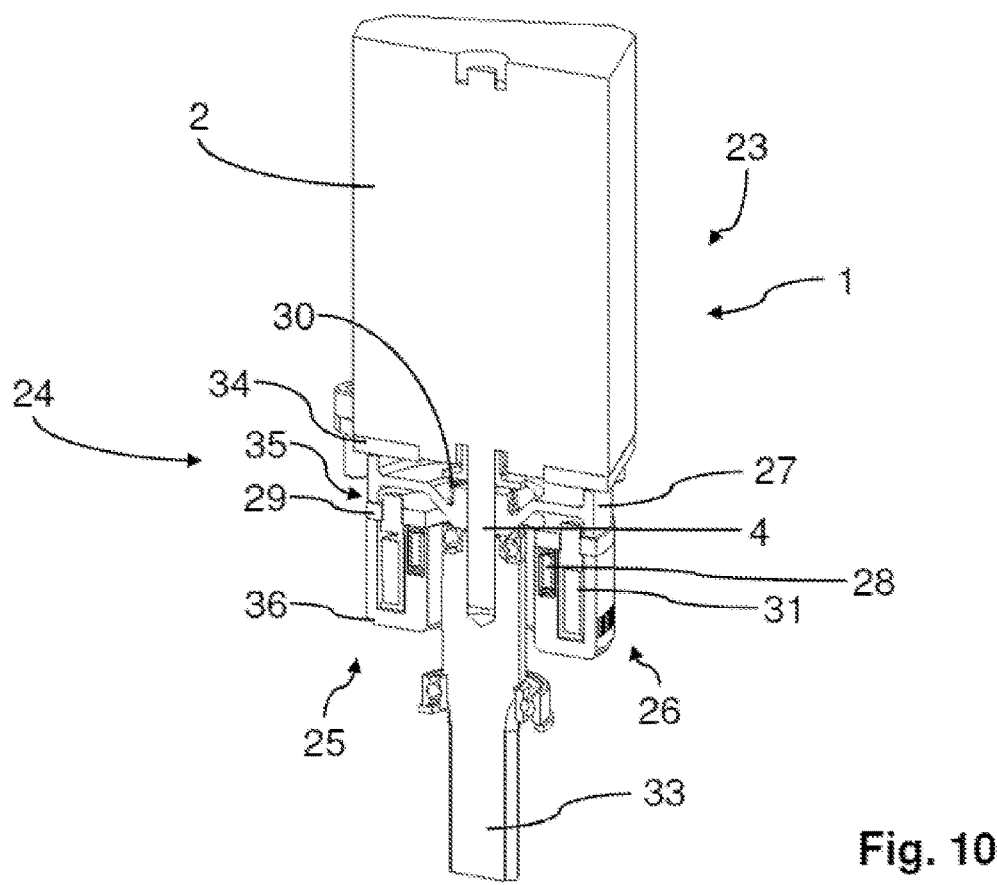
FIG. 10 represents a perspective view of the longitudinal section of the actuator in FIG. 9.
Figure 11:
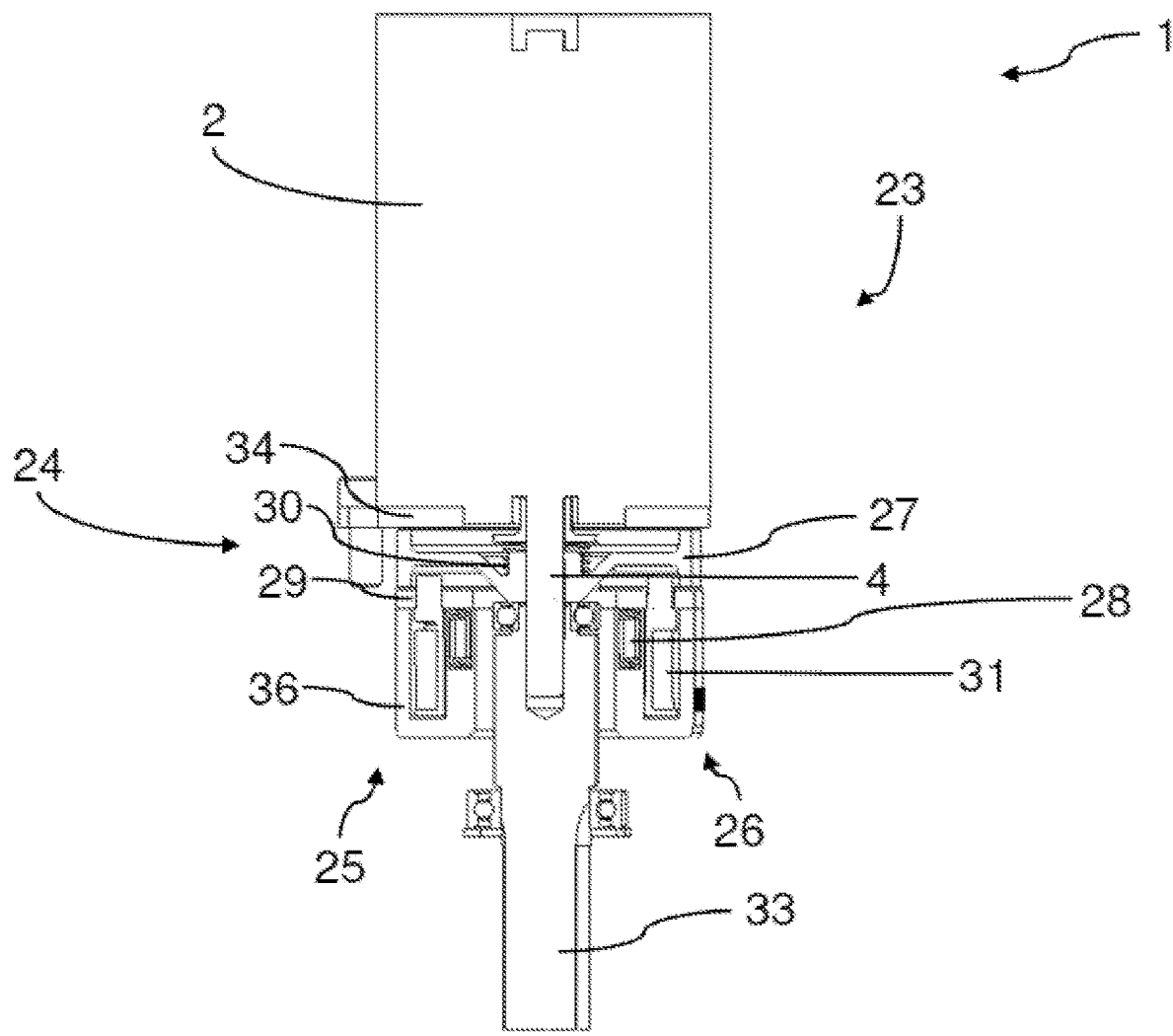
FIG. 11 represents another view of the aforementioned actuator.

In the embodiments in FIGS. 9-11, the main focus is on an actuator 1 with a motor 2 and a holding brake 23. Holding brake 23 can be designed, e.g., as a safety brake, particularly a spring-actuated brake.

The holding brake 23 has at least two pressure springs 28, with which a braking force can be generated. The braking torque is generated in a de-energized state of the holding brake 23. In the embodiment shown, the brake 23 is released electromagnetically.

The holding brake 23 has a special feature in that it is arranged on the A-bearing side 24 of motor 2, and is in direct operative connection with an output shaft 33 to be braked.

The output shaft 33 is connected to the motor shaft 4 driven by the motor 2. If the connection between motor shaft 4 and output shaft 33 is damaged, the holding brake 23 can still be used to brake and/or hold the output shaft. However, this would not be possible, if the holding brake 23 were arranged on the B-bearing side, since then, braking/holding of the output shaft 33 can only be done indirectly by braking/holding the motor shaft 4.

In de-energized state, the compression springs 28 push the at least one armature 29 against the brake disc 27 and/or the brake disc 27 against a motor flange 34. This results in a frictional connection, which generates a braking torque, and brakes or holds the output shaft 33.

In the energized state, in particular when a DC voltage is applied to an excitation winding 31, a magnetic field is produced, whose magnetic force resets the armature 29 against the spring force of the compression springs 28, such that an air gap 35 is produced between the armature 29 and the brake disc 27, and/or between the brake disc 27 and the motor flange 34. This state is referred to as a ventilated brake 23.

The brake disc 27, which is arranged non-rotatably on the output shaft 33, is thus released in the energized state and can then rotate together with the output shaft 33.

In the event of a fault or power failure, the pre-tensioned compression springs 28 immediately generate a braking torque or transmit a holding force, when the output shaft 33 is at a standstill.

Actuator 1 also includes a detection device 25 for determining the rotational speed of output shaft 33. The holding brake 23 of actuator 1 may be set up such that a brake control 26 can be activated or is activated, when the detection device 25 signals that a target rotational speed has been reached or was not fully reached. This has the advantage that when the output shaft 33 is rotating, it is first braked by a braking torque generated by motor 2, before a braking torque generated by brake 23 acts on output shaft 33. This means that the holding brake 23 can be designed smaller than conventional brakes for complete braking of an output shaft 33. Furthermore, wear on brake 23 can thus be reduced, as less heat is generated by the frictional connection described above.

The invention thus relates in particular to an actuator 1 with a modular system for creating a plug-in gearbox 3, wherein the modular system has at least one output gear wheel 5 and at least one plug-in element 7, 8, 9, 10, and wherein the modular system can create a plug-in gearbox 3 with one to five stages, as described and claimed herein.

What is claimed is:

1. An actuator, comprising:
   a motor; and
   a plug-in gearbox including:
   a motor shaft;
   an output gear wheel; and
   at least one plug-in element positioned between the motor shaft and the output gear wheel, wherein the at least one plug-in element includes at least one gear wheel to operatively engage with the motor shaft and the output gear wheel for transmitting torque from the motor shaft to the output gear wheel,
   wherein the motor shaft and the output gear wheel are axially adjustable relative to one another, wherein the motor shaft and the output gear wheel can be set to at least two different positions resulting in different gear ratios, and
   wherein with the axial adjustment of the motor shaft and the output gear wheel relative to one another space can be created between the motor shaft and the output gear wheel, and
   in that space, the at least one plug-in element can be optionally arranged to change the gear ratio for setting up a desired output torque at the output gear wheel, such that
   when positioning at least one plug-in element therebetween to operatively engage with the motor shaft and the output gear wheel, the plug-in gearbox is configured to a preferred gear ratio, thereby adjusting a required output torque on the output gear wheel.

2. The actuator of claim 1, wherein at least one installation position space is provided in the space created between the motor shaft and the output gear wheel for the at least one plug-in element.

3. The actuator of claim 1, wherein the at least one plug-in element is configured to be fastened on at least one pin.

4. The actuator of claim 3, wherein the at least one plug-in element comprises at least two plug-in elements arranged on the at least one pin.

5. The actuator of claim 3, wherein the at least one plug-in element is fastenable by at least one spacer sleeve in an axial position along the at least one pin, and wherein the at least one plug-in element comprises at least two plug-in elements arranged axially offset from one another.

6. The actuator of claim 1, wherein the at least one plug-in element comprises at least three plug-in elements arranged between the motor shaft and the output gear wheel.

7. The actuator of claim 1, wherein the at least one plug-in element comprises two gear wheels with different diameters, and wherein the at least one plug-in element is configured to be fastened in two different orientations.

8. The actuator of claim 7, wherein an insertion area of pins has at least two pin insertion points, wherein a distance between the pin insertion points is smaller than the diameter of a smallest gear wheel of the two gear wheels.

9. The actuator of claim 1, wherein a mesh area of the motor shaft, which rotates in a circumferential direction and/or has teeth, is longer in an axial direction than a mesh area of the gear wheel of the at least one plug-in element.

10. The actuator of claim 1, further comprising an output shaft configured for operative connection with a functional unit, wherein the output shaft is configured to transmit torque to the functional unit.

11. The actuator of claim 10, wherein the functional unit comprises a valve.

12. The actuator of claim 1, wherein performance characteristics of the plug-in-gearbox can be adapted by installing differently sized plug-in elements to create different gear ratios.

13. The actuator of claim 1, wherein the at least one plug-in element comprises more than one plug-in element, and wherein the at least one gear wheel of each plug-in element is configured to transmit torque to a successive plug-in element and/or the output gear wheel.

14. The actuator of claim 1, wherein the at least one plug-in element comprises more than one plug-in element with each plug-in element having two gear wheels with different diameters, wherein the two gear wheels with different diameters of each of the plug-in elements are positioned relative to the two gear wheels with different diameters of an adjacent plug-in element in two different orientations to operate cooperatively for creating different gear ratios.

15. The actuator of claim 1, wherein the at least one plug-in element comprises more than one plug-in element, wherein the orientation and/or axial position of each of the plug-in elements with respect to the motor shaft and the output gear wheel varies from one plug-in element to another plug-in element.

16. The actuator of claim 1, wherein the axial adjustment of the motor shaft and the output gear wheel relative to one another comprises:
changing a position of the motor shaft in an axial direction corresponding to a rotational axis of the motor shaft; and/or
changing a position of the output gear wheel in an axial direction corresponding to a rotational axis of the output gear wheel.

* * * * *